2,931,710

REMOVAL OF PHOSGENE FROM BORON TRIHALIDES

Amos J. Leffler, Lafayette, Calif., assignor to Stauffer Chemical Company, a corporation of Delaware No Drawing. Application December 14, 1956
Serial No. 628,245

4 Claims. (Cl. 23—205)

This invention relates to the purification of boron trichloride and tribromide and, more specifically, relates to the purification of boron trihalides to remove phosgene therefrom. In the manufacture of boron trichloride and boron tribromide, phosgene is frequently produced and, since phosgene interferes with the ultimate use of the boron trihalide, it is highly desirable to remove the phosgene.

In accordance with the present invention, a method is provided for the purification of boron trihalides wherein it is not necessary to condense the boron trihalide as it is produced and subject it to a separate operation; the process of the present invention enables one to remove phosgene continuously from the boron trihalide as it is produced, without any intermediate step. However, the invention is applicable at other stages of the process so that if one has a boron trihalide which is contaminated with phosgene, the boron trihalide may be volatilized and the phosgene removed therefrom by practicing the present invention.

Preferably, the process of the present invention is carried out at a temperature of from about 400° C. to 500° C. although higher or lower temperatures may be used. In general, the purification is accomplished by passing the material containing phosgene over metallic copper at an elevated temperature. The invention also will remove free chlorine, which is another frequent contaminant of boron trihalides. It has been found that if a small amount of hydrogen is added to the boron trihalide being treated, the copper will last for a longer period of time. From 5% to 10% hydrogen may be used.

The following working examples illustrate methods of practicing the present invention:

*Example 1.*—Boron trichloride issuing from a reactor was passed through a Vycor tube containing metallic copper in the form of strips, the Vycor tube and copper being maintained at a temperature of 500° C. Before passing through the tube, the boron trichloride contained 1% of phosgene and after passing through the tube, the issuing gases were condensed at −78° C. in a cold trap. The product was water-white, and infrared analysis showed it contained less than 0.01% of phosgene.

*Example 2.*—Boron tribromide was passed through a Vycor tube containing copper turnings at a temperature of 400° C. About 1200 ml. of the tribromide was passed over 225 g. of copper in three hours. The product was free of phosgene.

As the copper is used up, it may be replaced from time to time, or it may be regenerated periodically by passing hydrogen or ammonia over the copper while the copper is maintained at an elevated temperature. Any form of metallic copper may be used such as bars, powder, wire or the like, although it is generally preferred to use copper turnings because of the large surface area and ease of handling.

I claim:

1. The process of purifying a member selected from the group consisting of boron tribromide and boron trichloride containing a small percentage of phosgene comprising passing the member at a temperature of between about 400° C. and 500° C. over metallic copper at a temperature of between about 400° C. and 500° C.

2. The process of purifying a compound selected from the group consisting of boron tribromide and boron trichloride, said compound containing a small amount of phosgene as an impurity, comprising: adding a small amount of hydrogen gas to a vaporous stream of said compound and passing said admixture over metallic copper maintained at an elevated temperature.

3. The process of claim 2 wherein the hydrogen gas is present in a quantity of between about 5 and 10 percent by weight based upon the quantity of said compound containing said impurity.

4. A process for purifying a compound selected from the group consisting of boron tribromide and boron trichloride, said compound containing a small amount of phosgene as an impurity, comprising: passing said contaminated compound over metallic copper at an elevated temperature and intermittently regenerating said copper with a stream of a gas selected from the class consisting of hydrogen and ammonia while stopping the flow of said impure compound over said copper.

References Cited in the file of this patent

UNITED STATES PATENTS

| | | |
|---|---|---|
| 1,799,359 | Edmonds | Apr. 7, 1931 |
| 2,031,410 | Fulweiler | Feb. 18, 1936 |
| 2,369,214 | Cooper | Feb. 13, 1945 |

OTHER REFERENCES

Garner: "Charcoal as an Adsorbent," Natural Gas, November 1924, page 3.

Mellor: "Comprehensive Treatise on Inorganic and Theoretical Chemistry," vol. 7, page 79.